United States Patent Office 3,445,501
Patented May 20, 1969

3,445,501
CATALYTIC AMMOXIDATION OF OLEFINS TO NITRILES
Giorgio Caporali and Nicola Giordano, Milan, Italy, assignors to Montecatini Edison S.p.A., Milan, Italy
No Drawing. Filed Dec. 21, 1966, Ser. No. 603,432
Claims priority, application Italy, Dec. 28, 1965, 28,837/65
Int. Cl. C07c *121/32*
U.S. Cl. 260—465.3                    10 Claims

ABSTRACT OF THE DISCLOSURE

A catalyst of an oxygenated tellurium compound and an oxygenated antimony compound, the tellurium:antimony ratio therein preferably ranging from about 9:1 to about 1:1, and a process for the preparation of unsaturated nitriles by reacting an olefin, ammonia and either oxygen or an oxygen-containing gas in the presence of such catalyst.

BACKGROUND OF THE INVENTION

The present invention relates to an improved catalyst and to an improved catalytic process for the production of unsaturated nitriles, particularly acrylonitrile.

Many processes are known in the art for the preparation of unsaturated nitriles by reacting olefins with ammonia and oxygen in the presence of specific catalysts.

It has now been unexpectedly found that said processes can also be carried out by reacting a gaseous mixture comprising an olefin, ammonia and oxygen or gases containing oxygen in the presence of the specific catalyst described and exemplified hereunder.

THE INVENTION

The catalyst of this invention comprises tellurium and antimony, together with oxygen, in an atomic ratio of Te:Sb comprised between about 9:1 and about 1:1, while the oxygen is present in an amount necessary to maintain the said elements in the form of oxygenated compounds.

The aforesaid catalyst proved to be effective either when used as such or when suitably supported on conventional supports. It can also be used either in a fixed or in a fluidized bed.

The process according to this invention may be applied to e.g. propylene, for obtaining acrylonitrile, and to isobutylene, for obtaining methacrylonitrile.

Use of a pure olefin is preferred, but it has also been found that this process can be conducted in the presence of paraffinic hydrocarbons inert to the process under reaction conditions, and which act as diluents. Further, the oxygen required for the reaction can be fed as such or mixed with gases having an appropriate content of oxygen, for example, air.

The quantity of oxygen or of the gas containing the same which can be used in respect of the olefin, can vary over a broad range. Molar ratios of oxygen:olefin are preferably comprised between about 1:1 and about 3.5:1.

Ammonia can also be used in quantities which vary over a broad range in respect of the olefin, however, the molar ratio of ammonia to the olefin is preferably kept at between about 0.5:1 and about 1.5:1.

The reaction normally takes place at atmospheric pressure but can also be conducted at superatmospheric pressures.

The reaction temperature range is comprised between about 330° C. and about 550° C., but temperatures comprised between about 380° C. and about 500° C. are preferable, as good conversions can be obtained under said temperatures, even with comparatively short contact times.

Contact times can also vary within wide limits, as, for example, of from about 0.1 to about 20 seconds, but it was found in practice that by using the catalyst according to this invention, preferred contact times are comprised within the range of from about 0.5 to about 15 seconds.

When the catalyst according to this invention is employed carried on a support, the ratio between the active part and the support is preferably comprised between about 10% and about 50% by weight of the active part, stated as the addition of the top valence oxides, and between about 90–50% by weight of the support.

Several substances such as silica, alumina, Alundum, fire-clay and the like can be used as supports, either in the form of suitably granulated powders or as granules, as well as gels of silica or alumina. Particularly good results are achieved by using a support constituted of commercial microspheroidal macroporous silica.

In order to further illustrate the present invention and the advantages thereof, the following specific examples are given, it being understood that the same are merely intended to be illustrative and not limitative, and the first of which being directed to catalyst preparation while the others relate to the oxidizing reaction of an olefin in the presence of ammonia.

The following terms used in this specification have the following meanings:

Percent conversion of olefin =

$$\frac{\text{moles of reacted olefin}}{\text{moles of olefin fed}} \times 100$$

Net yield or selectivity = percent yield of the $x$ product in respect of converted olefin =

$$\frac{\text{weight of carbon atoms of the } x \text{ product}}{\text{weight of carbon atoms of converted olefin}} \times 100$$

Gross yield = percent yield of the $x$ product in respect of fed in olefin =

$$\frac{\text{weight of carbon atoms of the } x \text{ product}}{\text{weight of carbon atoms of fed in olefin}} \times 100$$

Contact time = the time during which one unit volume of the gaseous mixture fed, measured under the average conditions of temperature and pressure existing in the reactor, remains in contact with one apparent unit volume of catalyst.

Example 1

A catalyst with an active component comprising tellurium, antimony and oxygen in an atomic ratio of tellurium:antimony = 3:1 was prepared as follows:

32.3 g. of $H_2TeO_4 \cdot 2H_2O$ were dissolved in 85 ml. of water and the resulting solution was used for impregnating 87.7 g. of microspheroidal silica. The product thus obtained was dried at 110° C.–120° C. for 12 hours.

14.1 g. of $SbCl_5$ were mixed with 80 ml. of water and 5 g. of nitric acid titred at 65%. The product of the previous operation was impregnated with this second solution. The mass was thence subjected to drying at 10° C.–120° C. for 12 hours and subsequently activated in air at 550° C. for 8 hours. A catalyst was obtained in this manner consisting of 25% by weight active component and 75% by weight support.

Examples 2, 3 and 4

The catalyst prepared as in Example 1 was used by placing 4.5 cm.³ of the same in a reactor comprising a heated stainless steel pipe.

A gaseous mixture comprising propylene, ammonia and oxygen under molar ratios of respectively 1:1:10 was passed over the catalyst at atmospheric pressure.

The contact time was 2.5 seconds.

The products of the reaction were directly analyzed via gas chromatography.

The following results were obtained at temperatures of 400° C., 440° C. and 460° C.

| Example | Temper., °C. | Percent conversion of propylene | Percent net yield | | | | Percent gross yield of Acrylonitrile |
|---|---|---|---|---|---|---|---|
| | | | Acrylonitrile | Acetonitrile | $CO_2$ | CO | |
| 2 | 400 | | 79.6 | 5 | 15.4 | | |
| 3 | 440 | 53.5 | 80.5 | 2.8 | 16.6 | Traces | 43.1 |
| 4 | 460 | 69.2 | 75.9 | 2.7 | 19.4 | 2 | 52.5 |

It is remarked that similar results can be achieved by operating in similar fashion, but in a fluidized bed, while the thermal control of the reaction is more readily maintained when operating on a vast scale.

What is claimed is:

1. A process for the conversion of an olefin selected from the group consisting of propylene and isobutylene to acrylonitrile and methacrylonitrile, respectively, comprising contacting a mixture of the said olefin, ammonia and elemental oxygen in the gaseous phase at a temperature of from about 330° C. to about 550° C., with an active catalyst consisting essentially of tellurium, antimony and combined oxygen, the tellurium:antimony atomic ratio in such catalyst ranging from between about 9:1 to about 1:1.

2. The process as defined in claim 1, wherein the ratio of elemental oxygen to olefin in the reaction mixture ranges from between about 1:1 to about 3.5:1, and further wherein the ratio of ammonia to olefin in the reaction mixture ranges from between about 0.5:1 to about 1.5:1.

3. The process as defined by claim 2, wherein the contacting time ranges from between about 0.1 second to about 20 seconds.

4. The process as defined by claim 3, wherein the reaction is conducted in fluid bed.

5. The process as defined by claim 3, wherein the reaction is conducted in the presence of an inert diluent.

6. The process as defined by claim 3, wherein the active catalyst is associated with from about 90% to about 50% by weight of a support selected from the group consisting of silica, alumina, Alundum and fireclay.

7. The process as defined by claim 6, wherein the support is silica.

8. The process as defined by claim 3, wherein the contacting time ranges from between about 0.5 second to about 15 seconds, at a temperature of from about 380° C. to about 500° C., and at a pressure of about atmospheric.

9. The process as defined by claim 3, wherein propylene is converted to acrylonitrile.

10. The process as defined by claim 3, wherein isobutylene is converted to methacrylonitrile.

References Cited

UNITED STATES PATENTS 3,338,952  8/1967  Callahan et al. _____ 260—465.3

JOSEPH P. BRUST, *Primary Examiner.*

U.S. Cl. X.R.

252—439